(12) United States Patent
Miyata et al.

(10) Patent No.: US 7,461,717 B2
(45) Date of Patent: Dec. 9, 2008

(54) ACTIVATION CONTROL APPARATUS FOR OCCUPANT PROTECTION APPARATUS

(75) Inventors: Yujiro Miyata, Kariya (JP); Motomi Iyoda, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 421 days.

(21) Appl. No.: 10/565,165

(22) PCT Filed: Aug. 2, 2004

(86) PCT No.: PCT/JP2004/011392

§ 371 (c)(1),
(2), (4) Date: Jan. 19, 2006

(87) PCT Pub. No.: WO2005/012048

PCT Pub. Date: Feb. 10, 2005

(65) Prior Publication Data

US 2007/0114767 A1    May 24, 2007

(30) Foreign Application Priority Data

Aug. 5, 2003    (JP)    ............................. 2003-286460

(51) Int. Cl.
*B60K 28/10* (2006.01)
(52) U.S. Cl. .................. 180/274; 180/282; 280/735
(58) Field of Classification Search ................. 180/274, 180/282; 701/45; 280/735
See application file for complete search history.

(56) References Cited

U.S. PATENT DOCUMENTS

| | | | |
|---|---|---|---|
| 6,170,864 B1 | 1/2001 | Fujita et al. | |
| 6,199,903 B1 | 3/2001 | Brambilla et al. | |
| 6,324,454 B1 | 11/2001 | Obata et al. | |
| 6,540,255 B1 * | 4/2003 | Blank et al. | .................. 280/735 |
| 6,892,122 B2 * | 5/2005 | Miyata et al. | ................. 701/45 |
| 7,225,069 B2 * | 5/2007 | Stuetzler | ..................... 701/45 |
| 7,350,808 B2 * | 4/2008 | Miyata et al. | ............... 280/735 |

FOREIGN PATENT DOCUMENTS

| | | |
|---|---|---|
| DE | 101 55 663 A1 | 5/2003 |
| JP | A-10-152014 | 6/1998 |
| JP | A-2000-219098 | 8/2000 |
| JP | A-2002-104130 | 4/2002 |
| JP | A 2003-090844 | 3/2003 |
| WO | WO 01/54952 A2 | 8/2001 |
| WO | WO 02/28688 A1 | 4/2002 |

* cited by examiner

*Primary Examiner*—Eric Culbreth
(74) *Attorney, Agent, or Firm*—Oliff & Berridge, PLC

(57) ABSTRACT

An activation control apparatus controls activation of an airbag unit. An electronic control unit detects a floor deceleration Gf and front decelerations Gl, Gr from signals output from a floor sensor and front sensors. Also, the electronic control unit calculates a velocity change Vn from the floor deceleration Gf, and determines the severity of a collision. Further, the electronic control unit determines the state of a symmetric flag FRG through comparison between the front decelerations Gl, Gr and the value of a front determination map boundary, serving as a front threshold variation pattern and through comparison between the floor deceleration Gf and the value of a low or high map boundary, serving as an activation threshold variation pattern. Then, on the basis of results of the severity determination and the state of the symmetric flag FRG, the electronic control unit determines a delay time in relation to the activation of the airbag unit. An airbag is expanded and deployed on the basis of the delay time.

4 Claims, 5 Drawing Sheets

| SYMMETRIC FLAG FRG \ SEVERITY | High | Low |
|---|---|---|
| TRUE | 0ms | 30ms |
| FALSE | 30ms | 100ms |

US 7,461,717 B2

ACTIVATION CONTROL APPARATUS FOR OCCUPANT PROTECTION APPARATUS

TECHNICAL FIELD

The present invention relates to an apparatus for controlling activation of an occupant protection apparatus that protects an occupant during collision of a vehicle.

BACKGROUND ART

Japanese Patent Application Laid-Open (kokai) No. H10-152014 discloses a conventional activation control apparatus for an occupant protection apparatus. The conventional activation control apparatus includes satellite sensors provided on left front and right front portions of a vehicle, and a floor sensor provided at a central portion of the vehicle body. The activation control apparatus is configured to lower an airbag activation threshold of the floor sensor when one or more of the satellite sensors detects an impact equal to or greater than a predetermined reference value. Further, when the satellite sensor(s) detects an impact equal to or greater than the predetermined reference value, the conventional activation control apparatus determines that the severity of impact is high, and controls activation of the occupant protection apparatus.

Japanese Patent Application Laid-Open (kokai) No. 2000-219098 discloses another conventional activation control apparatus for an occupant protection apparatus. The conventional activation control apparatus includes front sensors provided on left front and right front portions of a vehicle, a floor sensor provided at a central portion of the vehicle body, and an output value control section for controlling output of an inflator, which activates an airbag unit on the basis of detection values from these sensors. The output value control section determines the nature of a collision on the basis of detection values from these sensors, and optimizes the output of the inflator in accordance with the determined nature of the collision.

Japanese Patent Application Laid-Open (kokai) No. 2002-104130 discloses still another conventional activation control apparatus for an occupant protection apparatus. The conventional activation control apparatus also includes satellite sensors provided on left front and right front portions of a vehicle, and a floor sensor provided at a central portion of the vehicle body. The activation control apparatus determines a value from the relation between a deceleration determined on the basis of an output signal of the floor sensor and a velocity obtained through time integration of the deceleration, and, when the determined value exceeds a threshold variation pattern for output use, increases activation output at the time of activation of an airbag unit. The activation control apparatus further determines a second value from the relation between a deceleration determined on the basis of output signals of the satellite sensors and the above-mentioned velocity, and, when the determined second value exceeds a predetermined threshold, replaces the threshold variation pattern for output use with a different pattern of lower threshold.

In the above-described conventional activation control apparatuses for an occupant protection apparatus, severity of impact caused by a collision of a vehicle is determined on the basis of detection values representing decelerations stemming from the collision and detected by means of satellite sensors (front sensors) provided at the front portion of the vehicle and a floor sensor provided at the central portion of the vehicle body. On the basis of the determined severity, activation of an airbag unit is controlled (between high output and low output).

However, even in collisions which are of substantially equal severity, activation of an airbag unit must be controlled in different manners in accordance with the nature of a collision between a vehicle and an object; i.e., depending on whether the collision is a symmetric collision (head-on collision, collision with a pole (hereinafter referred to as a "pole collision"), underride collision, etc.) or an asymmetrical collision (oblique collision, offset collision, etc.), because the time of deceleration stemming from a collision of a vehicle changes depending on the nature of the collision. Therefore, desire has arisen for optimally controlling activation of an airbag unit in accordance with the nature of a collision between a vehicle and an object.

DISCLOSURE OF THE INVENTION

The present invention has been accomplished so as to solve the above-mentioned problems, and an object of the present invention is to provide an activation control apparatus which optimally controls activation of an occupant protection apparatus of a vehicle in accordance with the nature of a collision of the vehicle.

The present invention provides an activation control apparatus for controlling activation of an occupant protection apparatus that protects an occupant during collision of a vehicle, comprising a first sensor disposed in a vehicle body to be located at a predetermined position, the first sensor outputting a signal corresponding to deceleration acting on the vehicle; a second sensor disposed in the vehicle body to be located forward with respect to the first sensor, the second sensor outputting a signal corresponding to deceleration acting on the vehicle; collision severity determination means for determining, on the basis of the signals output from the first and second sensors, whether a collision experienced by the vehicle is severe; collision symmetry determination means for determining, on the basis of the signals output from the first and second sensors, whether a collision portion of the vehicle has symmetry; delay time changing means for changing, on the basis of the severity determined by the collision severity determination means and results of the symmetry determination performed by the collision symmetry determination means, a delay time to be provided between a point in time when a first output of the occupant protection apparatus is activated and a point in time when a second output of the occupant protection apparatus is activated; and activation control means for controlling the activation of the first and second outputs of the occupant protection apparatus on the basis of the delay time changed by the delay time changing means.

By virtue of the above-described configuration, the delay time between activation of the first output and activation of the second output of the occupant protection apparatus can be changed depending on the symmetry of a collision portion of the vehicle involved in a collision; i.e., whether a collision is a symmetric collision, such as a head-on collision, a pole collision, or an underride collision, in which the collision portion is symmetric with respect to the center axis of the vehicle extending along the front-rear direction of the vehicle, or an asymmetric collision, such as an oblique collision or an offset collision, in which the collision portion is asymmetric with respect to the center axis. Therefore, activation of the occupant protection apparatus can be optimally controlled in accordance with a collision time (i.e., a time of a deceleration of the vehicle stemming from a collision), which varies depending on the collision type in terms of symmetry of a collision portion. Accordingly, the occupant protection apparatus can properly protect an occupant from an impact caused by a collision.

Preferably, when the collision symmetry determination means determines that the collision portion of the vehicle does not have symmetry, the delay time changing means increases the delay time as compared with a case in which the collision portion of the vehicle has symmetry.

By virtue of the above-described configuration, when a collision portion of the vehicle does not have symmetry; i.e., when the vehicle undergoes an asymmetrical collision, the operation period of the occupant protection apparatus can be increased through an increase in the delay time. Therefore, even in the case of an oblique collision or an offset collision, in which the deceleration time of the vehicle is long; i.e., the deceleration time of an occupant is long, activation control can be performed in such a manner that the operation state of the occupant protection apparatus is maintained properly so as to properly protect the occupant. Meanwhile, when the collision portion of the vehicle has symmetry; i.e., when the vehicle undergoes a symmetrical collision, the deceleration time of the occupant decreases. Therefore, the occupant can be properly protected through performance of activation control such that the operation period of the occupant protection apparatus is shortened.

Preferably, the delay time changing means sets the delay time to zero when the collision severity determination means determines that the collision experienced by the vehicle is severe and the collision symmetry determination means determines that the collision portion of the vehicle has symmetry; the delay time changing means sets the delay time to a short time when the collision severity determination means determines that the collision experienced by the vehicle is severe and the collision symmetry determination means determines that the collision portion of the vehicle does not have symmetry or when the collision severity determination means determines that the collision experienced by the vehicle is not severe and the collision symmetry determination means determines that the collision portion of the vehicle has symmetry; and the delay time changing means sets the delay time to a long time when the collision severity determination means determines that the collision experienced by the vehicle is not severe and the collision symmetry determination means determines that the collision portion of the vehicle does not have symmetry.

By virtue of the above configuration, the operation state of the occupant protection apparatus can be optimally controlled on the basis of the severity of a collision such as an amount of deformation of the vehicle stemming from the collision, and the symmetry of the collision portion. Specifically, when the collision is severe and is a symmetrical collision, the deceleration time of the occupant is short; that is, the deceleration is large. Therefore, the first and second outputs of the occupant protection apparatus are activated, with the delay time set to zero (substantially, concurrently). When the collision is severe and is an asymmetrical collision or when the collision is not severe and is a symmetrical collision, the deceleration is relatively large. Therefore, the first and second outputs of the occupant protection apparatus are activated, with the delay time set to a short time. When the collision is not severe and is an asymmetrical collision, the deceleration is relatively small. Therefore, the first and second outputs of the occupant protection apparatus are activated, with the delay time set to a long time. Thus, an occupant can be protected in an optimal manner that has been finely adjusted in accordance with the nature of a collision that is occurring.

Preferably, the collision symmetry determination means determines that the collision portion of the vehicle has symmetry when the deceleration acting on the vehicle and represented by the signal output from the first sensor is greater than a predetermined level.

By virtue of the above-described configuration, a collision that is occurring can be determined to be a symmetrical collision from the magnitude of the deceleration detected by the first sensor. The determination that a symmetric collision has occurred and the deceleration of an occupant is large can be made quickly, whereby the occupant protection apparatus can be properly activated in an optimal manner, and thus the occupant can be properly protected.

Preferably, the occupant protection apparatus is a multistage airbag apparatus including a plurality of inflators.

Preferably, the first sensor is disposed on or in the vicinity of a floor tunnel provided at a central portion of the vehicle body; and the second sensor is disposed at a side member provided at a front portion of the vehicle body.

BEST MODE FOR CARRYING OUT THE INVENTION

Figure 1:
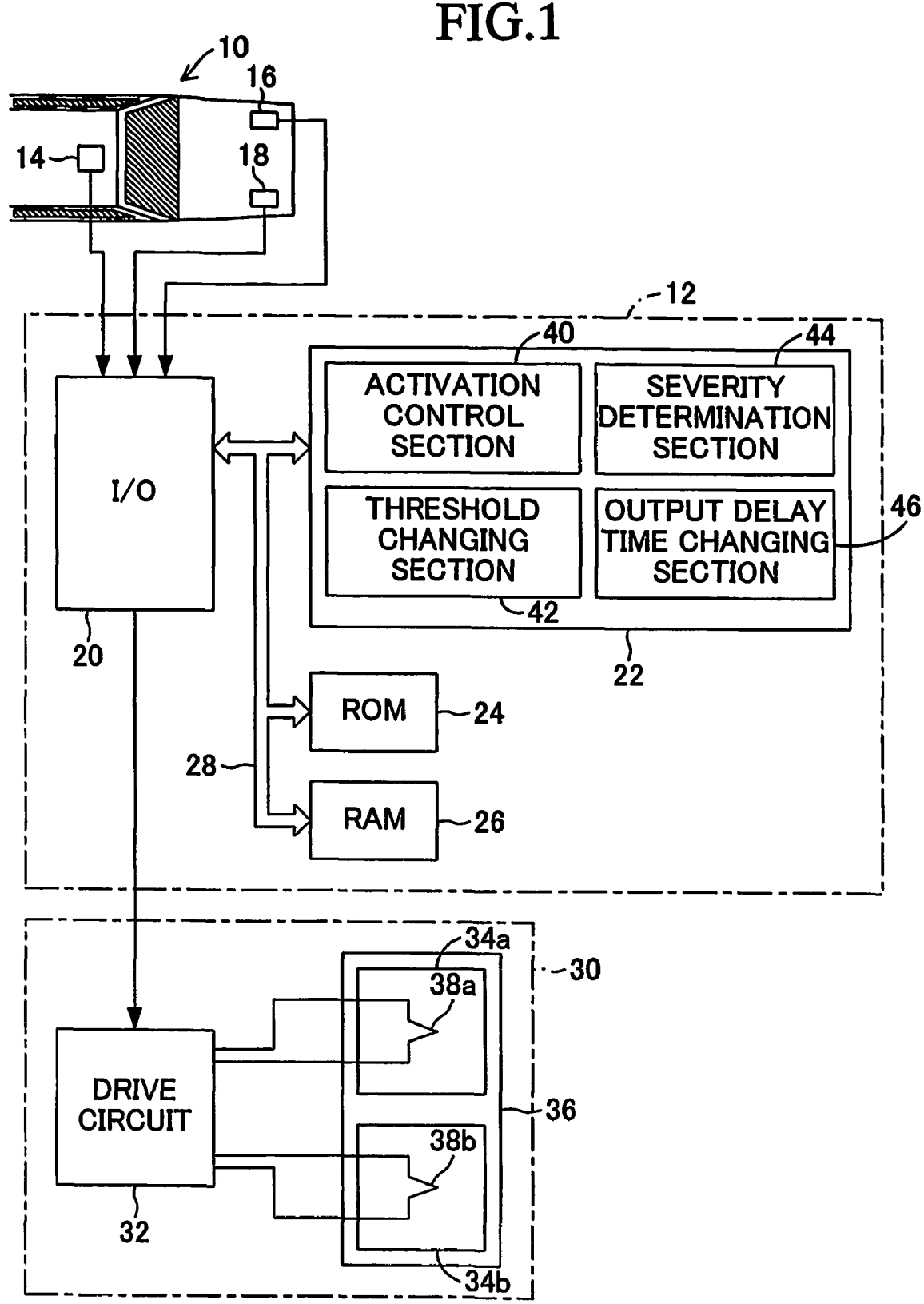
FIG. 1 is a system block diagram of an activation control apparatus for an occupant protection apparatus according to an embodiment of the present invention.

An embodiment of the present invention will be described with reference to the drawings. FIG. 1 is a block diagram showing a system configuration of an activation control apparatus for an occupant protection apparatus according to the embodiment. The system includes an electronic control unit (hereinafter, simply referred to as "ECU") 12 mounted on a vehicle 10 in order to control various operations. The system further includes a floor sensor 14 disposed in the vicinity of a floor tunnel provided in a central portion of a vehicle body, and front sensors 16 and 18 disposed on left and right side members provided in a front portion of the vehicle. Each of the floor sensor 14 and the front sensors 16 and 18 is an electronic deceleration sensor which outputs a signal corresponding to the magnitude of an impact acting on a corresponding sensor-disposed portion in the front-rear direction of the vehicle (specifically, the magnitude of a deceleration in the front-rear direction of the vehicle).

The ECU 12 includes an input-output circuit 20; a central processing unit (hereinafter, simply referred to as CPU) 22; read only memory (hereinafter, simply referred to as ROM) 24, in which are previously stored various programs, including processing program to be described later, tables necessary for calculation, etc.; random access memory (hereinafter, simply referred to as RAM) 26, which is used as a work area; and a bi-directional bus 28, which connects these elements.

The floor sensor 14 and the front sensors 16 and 18 are connected via the input-output circuit 20 to the ECU 12 configured as described above. Thus, an output signal of the floor sensor 14 and output signals of the front sensors 16 and 18 are supplied to the input-output circuit 20, and stored in the RAM 26 at appropriate timings in accordance with instructions from the CPU 22. On the basis of the output signal of the floor sensor 14, the ECU 12 detects the magnitude Gf of a deceleration acting on a central portion of the vehicle body in the front-rear direction of the vehicle (hereinafter, the magnitude Gf will be referred to as floor deceleration Gf). Further, on the basis of the output signals of the front sensors 16 and 18, the ECU 12 detects the magnitudes Gl and Gr of decelerations acting on the left front portion and right front portion, respectively, of the vehicle body in the front-rear direction of the vehicle (hereinafter, the magnitudes Gl and Gr will be referred to as front decelerations Gl and Gr).

The system of the activation control apparatus for an occupant protection apparatus includes an airbag unit 30, which is mounted on the vehicle 10 and operates to protect a vehicle occupant. The airbag unit 30 includes a drive circuit 32, inflators 34a and 34b, and an airbag 36. The drive circuit 32 of the airbag unit 30 is connected to the input-output circuit 20 of the ECU 12. When a drive signal is supplied from the ECU 12 to the drive circuit 32 via the input-output circuit 20, the airbag unit 30 is activated so as to deploy the airbag 36. The inflators 34a and 34b contain respective ignition devices 38a and 38b connected to the drive circuit 32, and respective gas generating agents (not shown), each of which produces a large amount of gas upon generation of heat by the ignition device 38a or 38b. The inflators 34a and 34b expand and deploy the airbag 36 through generation of gas.

The airbag 36 is of a multi-stage type. When the ignition devices 38a and 38b in the inflators 34a and 34b generate heat simultaneously, a high gas pressure is produced from the beginning, and the airbag 36 is expanded and deployed by the thus-produced high pressure. When the ignition devices 38a and 38b in the inflators 34a and 34b generate heat with a predetermined time difference (i.e., a delay) therebetween, a low gas pressure is first produced, and a high pressure is then produced with a delay, whereby the airbag 36 is expanded and deployed stepwise by the thus-produced low and high pressures. The thus-deployed airbag 36 is located between an occupant of the vehicle 10 and a component mounted on the vehicle.

The CPU 22 of the ECU 12 includes an activation control section 40, a threshold changing section 42, a severity determination section 44, and an output delay time changing section 46. As will be described later, in accordance with the processing program stored in the ROM 24, the activation control section 40 determines, on the basis of the floor deceleration Gf, whether to activate the airbag unit 30. Then, the activation control section 40 controls the supply of drive signals from the input-output circuit 20 to the drive circuit 32 of the airbag unit 30. As will be described later, the threshold changing section 42 determines or selects, on the basis of the floor deceleration Gf and the front decelerations Gl and Gr, an effective one of a plurality of threshold variation patterns (hereinafter referred to as activation threshold variation patterns), which are defined on an activation determination map and used by the activation control section 40 so as to determine whether to activate the airbag unit 30.

As will be described later, the severity determination section 44 performs severity determination through comparison between the front decelerations Gl and Gr and a reference value, which is previously set for determination of a severity of an impact stemming from a collision. As will be described later, the output delay time changing section 46 sets, on the basis of the severity determined by means of the severity determination section 44 and the symmetry of a collision of the vehicle 10, the timing of deployment of the airbag 36; i.e., a delay time to be provided between the first stage ignition (effected by one of the ignition devices 38a and 38b), and the second stage ignition (effected by the other of the ignition devices 38a and 38b).

Figure 2:
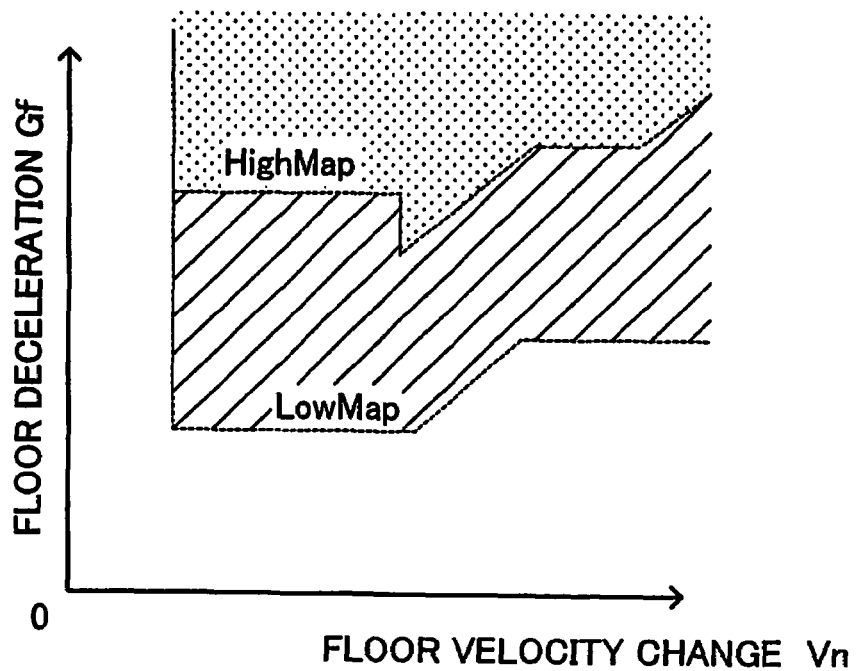
FIG. 2 is a graph showing an activation threshold variation pattern according to the embodiment, which pattern serves as an activation determination map boundary defined for the relation between floor deceleration Gf and floor velocity change Vn.

Next, the details of the processing performed in the CPU 22 will be described. The activation control section 40 of the CPU 22 determines whether to activate the airbag unit 30, on the basis of an activation determination map. As shown in FIG. 2, the activation determination map includes, as activation threshold variation patterns, two boundaries; i.e., a high map boundary and a low map boundary, which are illustrated by broken lines. The high map boundary is present between a region in which the airbag unit 30 must be activated when an impact acts on the vehicle 10, and a region in which the airbag unit 30 is not required to be activated even when an impact acts on the vehicle 10. The low map boundary is present between a region in which the airbag unit 30 must be activated when an impact acts on the vehicle 10 under a predetermined condition, and a region in which the airbag unit 30 is not required to be activated even when an impact acts on the vehicle 10 under the predetermined condition. Both the high map boundary and the low map boundary are stored in the ROM 24.

The activation control section 40 time-integrates the floor deceleration Gf at predetermined intervals (e.g., 10 msec) so as to obtain a velocity change Vn per unit time. When a floor deceleration Gf acts on the vehicle 10 during travel, because of inertia, an object (e.g., an occupant) in the vehicle 10 accelerates frontward relative to the vehicle 10. Therefore, the relative velocity change Vn of the object within the vehicle with respect to the vehicle 10 can be obtained through time integration of the floor deceleration Gf. After calculation of the velocity change Vn, the activation control section 40 determines a region of the activation determination map (i.e., one of the regions divided by the high and low map boundaries) which contains a position determined from the relation between the floor deceleration Gf and the velocity change Vn.

Specifically, when the activation control section 40 determines that the position determined from the relation between the floor deceleration Gf and the velocity change Vn is located in the region above the high map boundary (in a dotted region in FIG. 2), the activation control section 40 determines that a large impact is acting on the central portion of the vehicle body, and supplies a drive signal to the drive circuit 32 of the airbag unit 30 via the input-output circuit 20 so as to expand and deploy the airbag 36 in all cases. In this case, the airbag 36 is deployed upon activation of the airbag unit 30. Therefore, when the position determined from the relation between the floor deceleration Gf and the velocity change Vn is located in the region above the high map boundary, i.e., the dotted region in FIG. 2, the airbag 36 is expanded and deployed in all cases.

As described above, the high map boundary is set to be present between the region in which the airbag unit 30 must be activated when an impact acts on the vehicle 10, and the region in which the airbag unit 30 is not required to be activated even when an impact acts on the vehicle 10. However, in some cases; i.e., depending on the nature or manner of a collision, the airbag unit 30 must be activated even when the position determined from the relation between the floor deceleration Gf and the velocity change Vn is not located in the region above the high map boundary (in the dotted region in FIG. 2).

Specifically, in an example case where the vehicle 10 obliquely collides with an object at an intermediate speed (e.g., 32 km/h), the airbag unit 30 must be activated even though the position determined from the relation between the floor deceleration Gf and the velocity change Vn is not located in the region above the high map boundary. In the example case where the vehicle 10 obliquely collides with an object at an intermediate speed, a large impact acts on a front portion of the vehicle body. Therefore, in cases where a large impact acts on a front portion of the vehicle body; i.e., a large deceleration is produced at a left front portion or a right front portion of the vehicle body, the activation control section 40 activates the airbag unit 30 even when the position determined from the relation between the floor deceleration Gf and the velocity change Vn is not located in the region above the high map boundary, so long as the position is located in the region above the low map boundary (a hatched region in FIG. 2).

Figure 3:
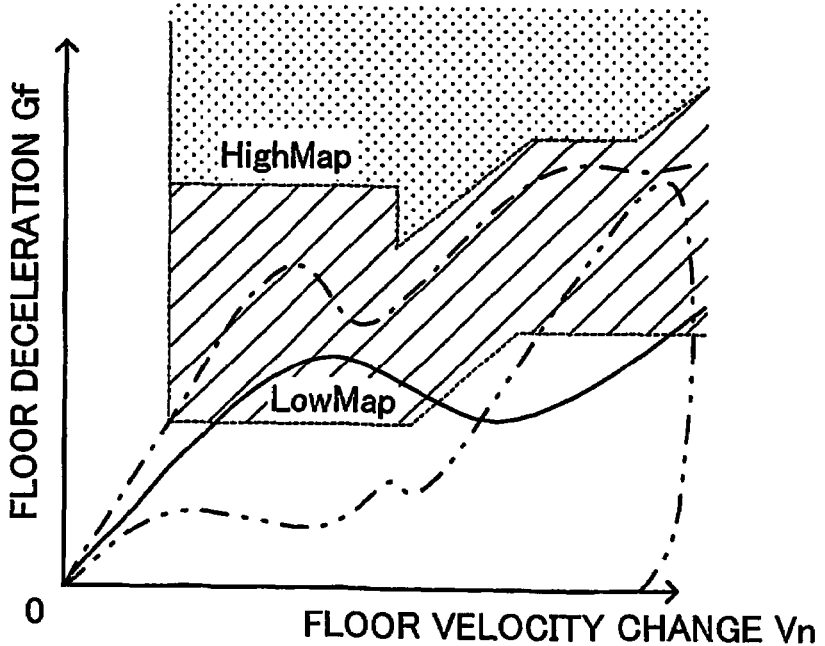
FIG. 3 is a graph showing the activation threshold variation pattern according to the embodiment, which pattern serves as an activation determination map boundary defined for the relation between floor deceleration Gf and floor velocity change Vn, and in which the relation is plotted at uniform time intervals for each of different manners of collision.

Meanwhile, a collision may occur in a manner in which the airbag unit 30 is not required to be activated even though a large impact acts on a front portion of the vehicle body. That is, in the case of a low-speed head-on collision in which the vehicle 10 collides head-on with an object at a low speed or a low-speed underride collision in which the vehicle 10 runs into a space under an object and collides therewith at a low speed, the airbag unit 30 is not required to be activated. In the case of these collision types as well, the activation control section 40 determines whether to activate the airbag unit 30, on the basis of the low map boundary of the activation determination map. This will be described specifically with reference to FIG. 3. FIG. 3 shows the relation between the floor deceleration Gf and the velocity change Vn for each of different collision types. In FIG. 3, the above relation for the case where the vehicle 10 causes an oblique collision at an intermediate speed is represented by a solid line; the above relation for the case where the vehicle 10 causes a head-on collision at a low speed (e.g., 18 km/h) is represented by a line consisting of alternating long and short dashes; and the above relation for the case where the vehicle 10 causes an underride collision at a low speed is represented by a line consisting of one long dash alternating with two short dashes.

In the case where the vehicle 10 collides head-on with an object at a low speed or the case where the vehicle 10 causes an underride collision at a low speed, the activation control section 40 activates the airbag unit 30 if the position determined from the relation between the floor deceleration Gf and the velocity change Vn is located in the region between the low map boundary and the high map boundary on the activation determination map shown in FIG. 3. If the low map boundary of the activation determination map is valid all times, even in the case of a low-speed head-on collision or a low-speed underride collision for which the airbag unit 30 is not required to be activated, the activation control section 40 activates the airbag unit 30 if the position determined from the relation between the floor deceleration Gf and the velocity change Vn is located in the region above the low map boundary. Therefore, the low map boundary is validated or invalidated on the basis of the deceleration at the front portion of the vehicle body, which varies in accordance with the type or manner of a collision.

The threshold changing section 42 time-integrates the floor deceleration Gf at predetermined intervals to thereby obtain a velocity change Vn per unit time, as the activation control section 40 does. The threshold changing section 42 determines a region of the front determination map shown in FIG. 4 which includes a first position determined from the relation between the velocity change Vn, which is derived from the floor deceleration Gf, and the front deceleration Gl, which is detected on the basis of the output signal of the front sensor 16 or a second position determined from the relation between the velocity change Vn and the front deceleration Gr, which is detected on the basis of the output signal of the front sensor 18.

Figure 4:
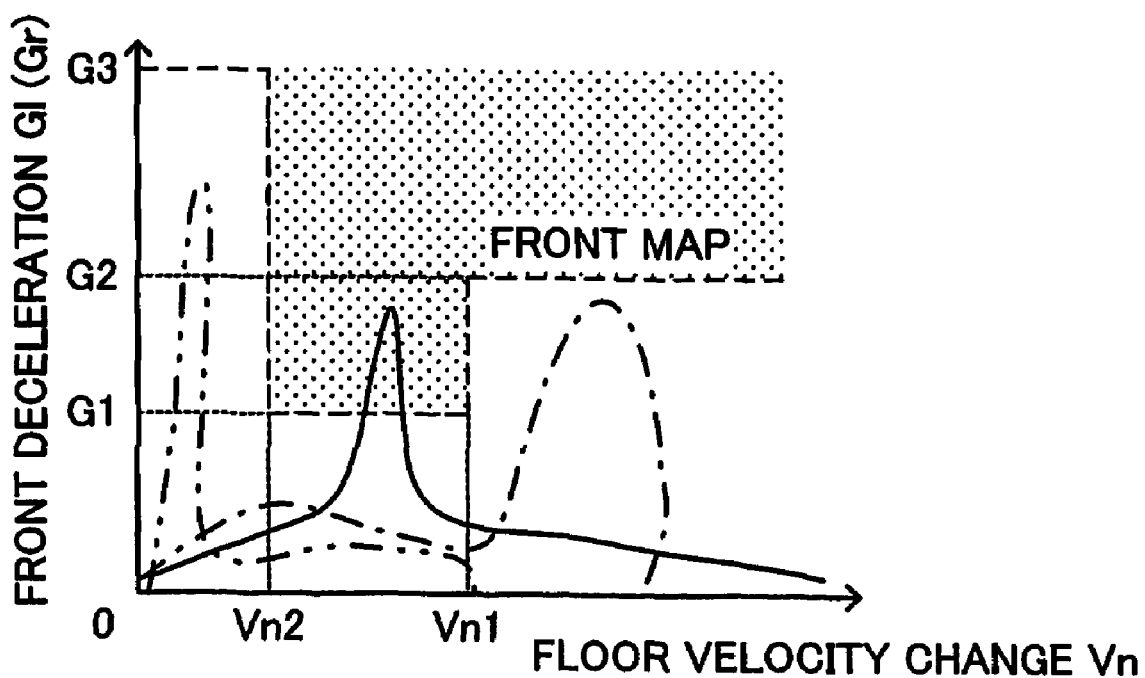
FIG. 4 is a graph showing a front threshold variation pattern according to the embodiment, which serves as a front determination map boundary defined for the relation between front decelerations Gl, Gr and floor velocity change Vn.

FIG. 4 shows an a threshold variation pattern (hereinafter referred to as a "front threshold variation pattern"), with which the deceleration at the front portion of the vehicle body is compared so as to determine whether the low map boundary (activation threshold variation pattern) on the determination map shown in FIGS. 2 and 3 is to be validated or invalidated. In FIG. 4, a front determination map boundary, which serves as the front threshold variation pattern, is represented by a broken line. The front determination map boundary is set to be present between a region in which the low map boundary, serving as the activation threshold variation pattern, is to be validated, and a region in which the low map boundary is to be invalidated. In FIG. 4, the above relation for the case where the vehicle 10 causes an oblique collision at an intermediate speed is represented by a solid line; the above relation for the case where the vehicle 10 causes a head-on collision at a low speed is represented by a line consisting of alternating long and short dashes; and the above relation for the case where the vehicle 10 causes an underride collision at a low speed is represented by a line consisting of long dashes alternating with two short dashes.

As shown in FIG. 4, the timing at which the front deceleration Gl (Gr) acting on the front portion of the vehicle body reaches its peak varies among the case where the vehicle 10 causes an oblique collision at an intermediate speed in which the airbag unit 30 must be activated under the condition that the position determined from the relation between the floor deceleration Gf and the velocity change Vn is located in the region between the low map boundary and the high map boundary on the activation determination map shown in FIG. 3, the case where the vehicle 10 causes a head-on collision at a low speed in which the airbag unit 30 is not required to be activated under such a condition, and the case where the vehicle 10 causes an underride collision at a low speed in which the airbag unit 30 is not required to be activated under such a condition. Specifically, as shown in FIG. 4, in each of the above-described three cases, a different relation is produced between the front deceleration Gl (Gr) and the floor velocity change Vn per unit time, derived from the floor deceleration Gf acting at the central portion of the vehicle body.

In view of the above, the front determination map boundary, which serves as the front threshold variation pattern, is set with respect to the relation between the front deceleration Gl (Gr) and the floor velocity change Vn in such a manner that the low map boundary is validated in the case of an intermediate-speed oblique collision, and is invalidated in the case of a low-speed head-on collision and in the case of a low-speed underride collision. That is, the threshold—with which the front deceleration Gl (Gr) is compared so as to determine whether the low map boundary, serving as the activation threshold variation pattern—is changed in accordance with the floor velocity change Vn. Thus, the airbag unit 30 can be properly activated in accordance with the type or manner of a collision.

Therefore, the ROM 24 stores the front determination map boundary, serving as the front threshold variation pattern, which is defined with respect to the relation between the front deceleration GI (Gr) and the floor velocity change Vn in such a manner that the low map boundary is validated in the case of an intermediate-speed oblique collision, and is invalidated in the case of a low-speed head-on collision and in the case of a low-speed underride collision. Specifically, in a region in which the floor velocity change Vn is not greater than a second value Vn2, the threshold for the front deceleration GI (Gr) is set to a large value G3 such that the low map boundary is not validated by a low-speed underride collision. In a region in which the floor velocity change Vn is between the second value Vn2 and a first value Vn1 greater than the second value Vn2, the threshold for the front deceleration GI (Gr) is set to a small value G1 such that the low map boundary is validated by an intermediate-speed oblique collision. Further, in a region in which the floor velocity change Vn is greater than the first value Vn1, the threshold for the front deceleration GI (Gr) is set to a value G2 between the values G3 and G1 such that the low map boundary is not validated by a low-speed head-on collision.

When the threshold changing section 42 determines, on the basis of the front determination map shown in FIG. 4, that the position determined from the relation between the front deceleration GI (Gr) and the floor velocity change Vn is located in the region above the front determination map boundary (a dotted region in FIG. 4), the threshold changing section 42 supplies a predetermined signal (hereinafter referred to as a "low map validation signal") to the activation control section 40 in order to validate the low map boundary, serving as the activation threshold variation pattern; i.e., allows the airbag unit 30 to be activated when the position determined from the relation between the floor deceleration Gf and the velocity change Vn is located in the region between the low map boundary and the high map boundary. Meanwhile, when the threshold changing section 42 determines that the position determined from the relation between the front deceleration GI (Gr) and the floor velocity change Vn is not located in the dotted region in FIG. 4, the threshold changing section 42 does not supply the low map validation signal to the activation control section 40.

The severity determination section 44 time-integrates the floor deceleration Gf at predetermined intervals to thereby obtain a velocity change Vn per unit time, as the activation control section 40 does. The severity determination section 44 determines, on the basis of a severity determination map shown in FIG. 5, variations with time in the velocity change Vn, the front deceleration GI detected on the basis of the output signal of the front sensor 16, and the front deceleration Gr detected on the basis of the output signal of the front sensor 18.

Figure 5:
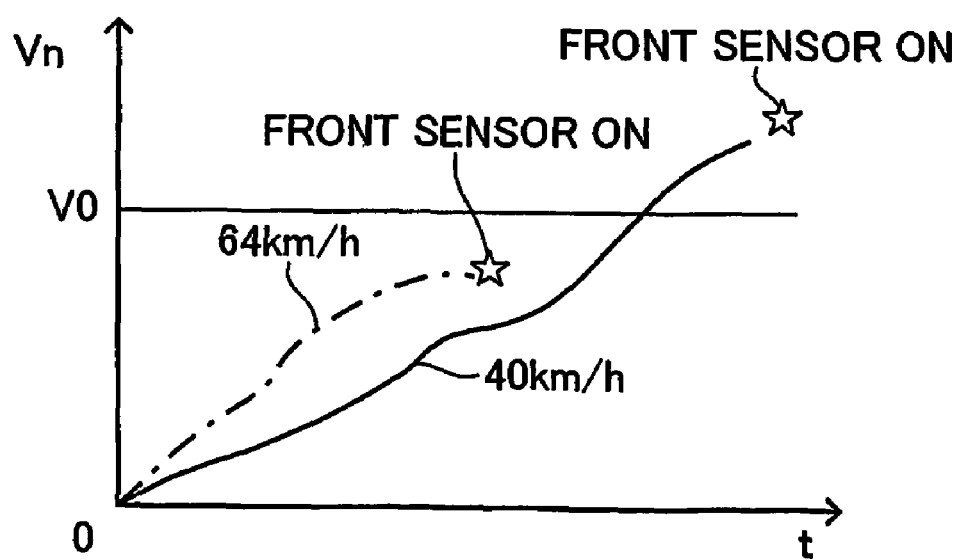
FIG. 5 is a graph showing a severity determination map according to the embodiment for determining a severity on the basis of the velocity change Vn.

FIG. 5 shows, in a comparable manner, variations with time in the velocity change Vn and the front decelerations GI and Gr for the case in which collision speed is high and those for the case in which collision speed is low. In FIG. 5, the above-mentioned variation for the case of a high collision speed (e.g., 64 km/h) is indicated by a line consisting of alternating long and short dashes, and that for the case of a low collision speed (e.g., 40 km/h) is indicated by a solid line. In the case where collision speed is low, the severity of the collision is low, and a front portion of the vehicle body deforms by a small amount. In contrast, in the case where collision speed is high, the severity of the collision is high, and the front portion of the vehicle body deforms by a large amount. Therefore, the time by which the impact acting on the front portion increased to some degree is advanced as the collision speed increases. In this regard, in the case where the collision speed is high, as indicated by the line in FIG. 5 consisting of alternating long and short dashes, even after the impact acting on the front portion has increased to a relatively high level, a central portion of the vehicle body has not yet decelerated very much at that time. That is, when the central portion of the vehicle body has decelerated to a relatively large degree because of a collision, a large impact has already acted on the front portion of the vehicle body. Meanwhile, in the case where the collision speed is low, as indicated by the solid line in FIG. 5, when the impact acting on the front portion has increased to a relatively high level, the central portion of the vehicle body has already decelerated to some degree. That is, even at the time when the central portion of the vehicle body has decelerated to a relatively large degree because of a collision, the impact acting on the front portion of the vehicle body has not yet increased very much.

Therefore, the severity of a collision of the vehicle 10 can be determined through setting a preset reference value which the front deceleration GI (Gr) must reach when an impact acting on the front portion of the vehicle body becomes large, as well as a floor deceleration reference value V0 which the velocity change Vn, obtained on the basis of the output signal of the floor sensor 14, must reach when the central portion of the vehicle body decelerates to some degree. The floor deceleration reference value V0 is a value determined from the relation between the impact acting on the front portion of the vehicle body and the velocity change Vn of the central portion of the vehicle body, and is set as a boundary between a region in which the severity is determined to be high and a region in which the severity is determined to be low.

The severity determination section 44 stores the severity determination map shown in FIG. 5. On the basis of the severity determination map, the severity determination section 44 determines that an impact acting on the front portion of the vehicle body is at a relatively high level, and the central portion of the vehicle body has decelerated to some degree, when the front deceleration GI (Gr) is higher than the reference value and the floor velocity change Vn is higher than the floor deceleration reference value V0. Therefore, the severity determination section 44 determines that the collision speed is low; i.e., the severity is low, and supplies a low severity signal to the output delay time changing section 46. Meanwhile, when the front deceleration GI (Gr) is higher than the reference value and the floor velocity change Vn is not higher than the floor deceleration reference value V0, the central portion of the vehicle body can be determined not to have decelerated very much after the impact acting on the front portion of the vehicle body has increased to a relatively large level. Therefore, the severity determination section 44 determines that the collision speed is high; i.e., the severity is high, and supplies a high severity signal to the output delay time changing section 46.

The output delay time changing section 46 receives from the activation control section 40 a predetermined piece of information (hereinafter referred to a symmetric flag FRG) which represents whether the drive signal supplied to the airbag unit 30 is a signal generated upon entrance to the region above the high map boundary or a signal generated upon entrance to the region above the low boundary. The symmetric flag FRG is output while being set to a "TRUE" state when a collision caused by the vehicle 10 is symmetric with respect to the center axis of the vehicle 10; e.g., when a head-on collision, a pole collision, or an underride collision occurs at an intermediate or high speed. Meanwhile, the symmetric flag FRG is output while being set to a "FALSE" state when the collision caused by the vehicle 10 is asymmetric with respect to the center axis of the vehicle 10; e.g., when an oblique collision or an offset collision occurs.

Specifically, when the threshold changing section 42 selects the high map boundary as the activation threshold variation pattern to be used by the activation control section 40, the floor deceleration Gf is high irrespective of the font decelerations GI and Gr. In such a state, a collision of the vehicle 10 is predicted to be a symmetric collision, and the symmetric flag FRG is set to "TRUE." Meanwhile, when the threshold changing section 42 selects the low map boundary as the activation threshold variation pattern to be used by the activation control section 40, the determination is made on the basis of the front decelerations GI and Gr. In such a state, the collision of the vehicle 10 is predicted to be an asymmetric collision, and the symmetric flag FRG is set to "FALSE."

Further, the output delay time changing section 46 receives the low severity signal or the high severity signal from the severity determination section 44. As described above, the output delay time changing section 46 obtains the symmetric flag FRG and the low severity signal or the high severity signal, and determines, on the basis of a delay time table shown in FIG. 6, an output timing at which the activation control section 40 outputs a second stage drive signal to the airbag unit 30. Then, the output delay time changing section 46 supplies to the activation control section 40 an ignition timing signal representing the output timing.

Specifically, when the symmetric flag FRG obtained from the activation control section 40 is "TRUE" and the high severity signal is obtained from the severity determination section 44, the output delay time changing section 46 supplies to the activation control section 40 an ignition timing signal which indicates that the delay time is to be set to, for example 0 sec; i.e., the first stage ignition (effected by one of the ignition devices 38a and 38b) and the second stage ignition (effected by the other of the ignition devices 38a and 38b) of the airbag 36 are to be performed substantially simultaneously. When the symmetric flag FRG obtained from the activation control section 40 is "TRUE" and the low severity signal is obtained from the severity determination section 44, the output delay time changing section 46 supplies to the activation control section 40 an ignition timing signal which indicates that the delay time is to be set to, for example 30 msec; i.e., the second stage ignition of the airbag 36 is to be performed after elapse of 30 msec from the first stage ignition thereof.

Further, when the symmetric flag FRG obtained from the activation control section 40 is "FALSE" and the high severity signal is obtained from the severity determination section 44, the output delay time changing section 46 supplies to the activation control section 40 an ignition timing signal which indicates that the delay time is to be set to, for example 30 msec; i.e., the second stage ignition of the airbag 36 is to be performed after elapse of 30 msec from the first stage ignition thereof. When the symmetric flag FRG obtained from the activation control section 40 is "FALSE" and the low severity signal is obtained from the severity determination section 44, the output delay time changing section 46 supplies to the activation control section 40 an ignition timing signal which indicates that the delay time is to be set to, for example 100 msec; i.e., the second stage ignition of the airbag 36 is to be performed after elapse of 100 msec from the first stage ignition thereof. Thus, the activation control section 40 outputs drive signals to the drive circuit 32 of the airbag unit 30 in accordance with the ignition timing signal obtained from the output delay time changing section 46.

Figures 6, 7:
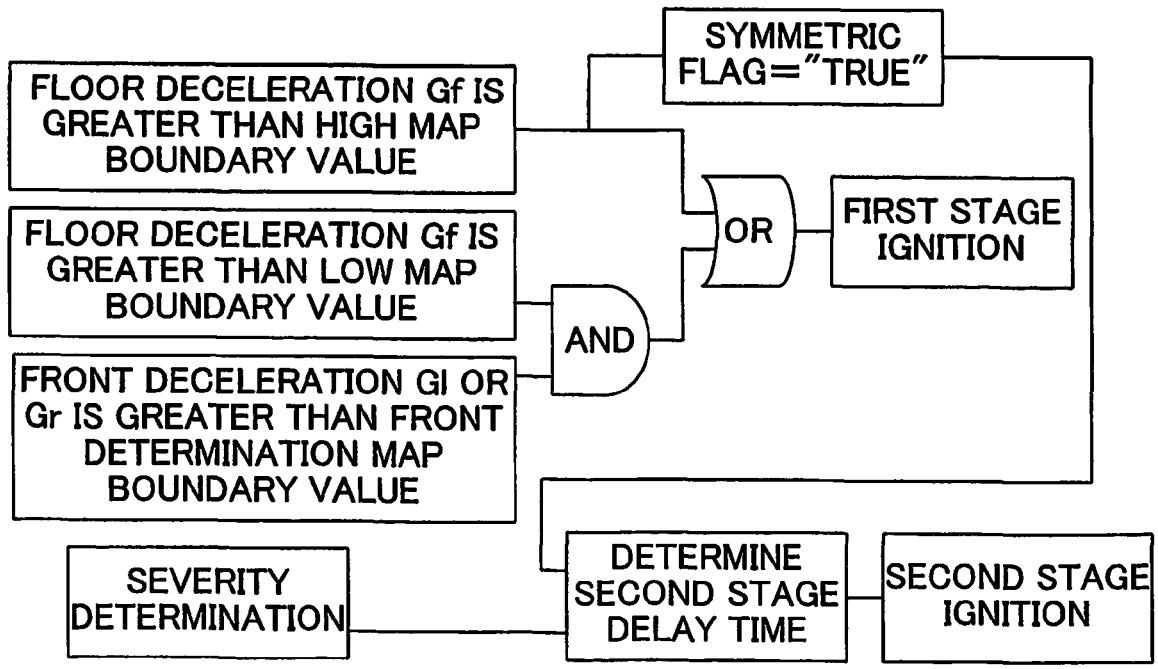
FIG. 6 is a table to which the activation control apparatus of FIG. 1 refers so as to determine a delay time.
FIG. 7 is a diagram showing conditions on the basis of which the activation control apparatus of FIG. 1 activates the occupant protection apparatus.

As described above, in the system according to the present invention, the airbag unit 30 is activated as shown in FIG. 7. Specifically, the first stage ignition of the airbag unit 30 is performed when the floor deceleration Gf exceeds the high map boundary (threshold) that changes in accordance with the velocity change Vn or when the floor deceleration Gf exceeds the low map boundary (threshold) that changes in accordance with the velocity change Vn and the front deceleration GI (Gr) exceeds the front determination map boundary (threshold) that changes in accordance with the front velocity change Vn. Further, in the system according to the present invention, the symmetric flag FRG is set to "TRUE" when the floor deceleration Gf exceeds the high map boundary (threshold) that changes in accordance with the velocity change Vn. Moreover, in the system according to the present invention, the second stage ignition timing of the airbag unit 30 is set on the basis of the results of the severity determination and the symmetric flag FRG, and the second stage ignition of the airbag unit 30 is effected on the basis of the thus-set ignition timing.

Figure 8:
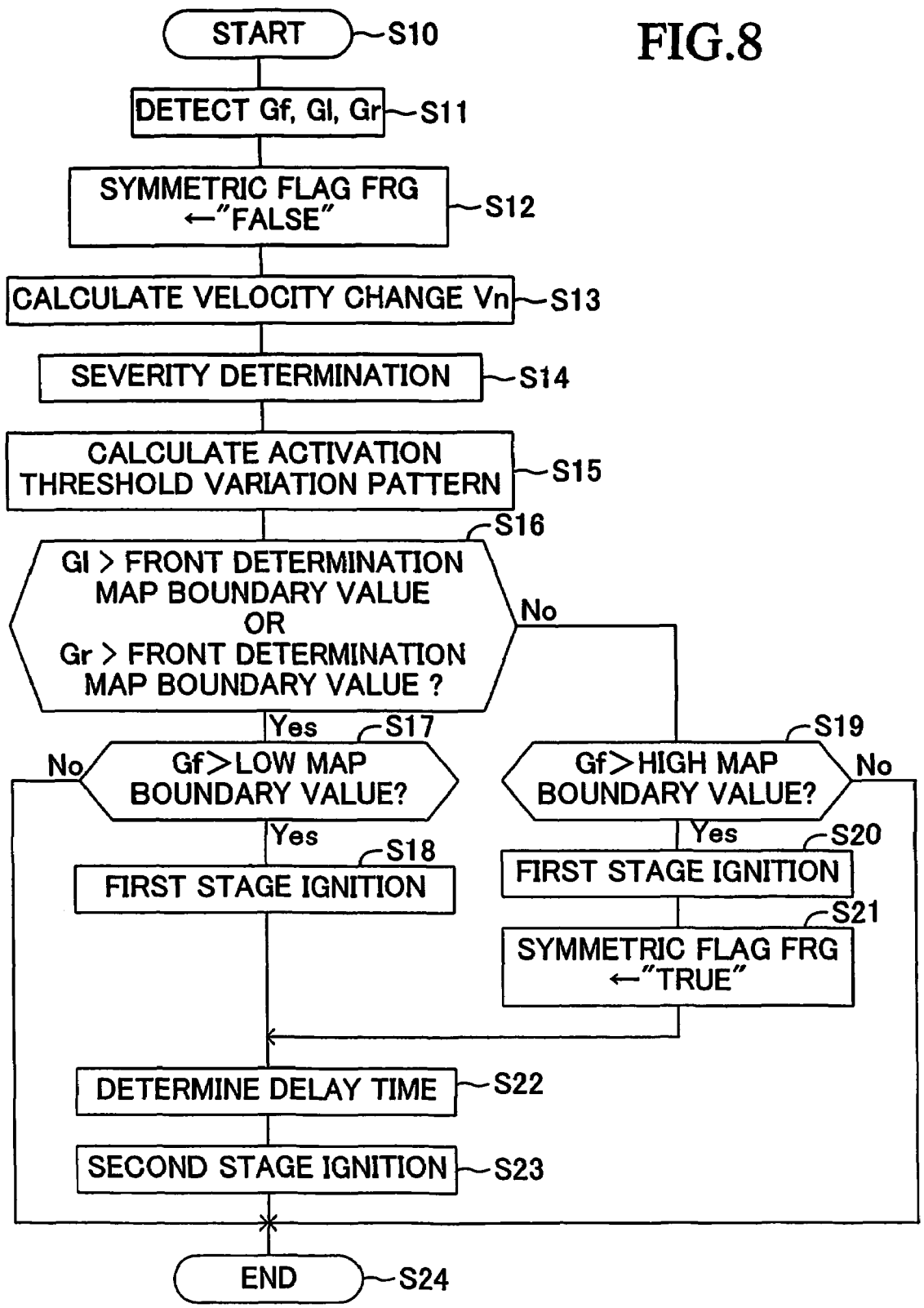
FIG. 8 is a flowchart of a processing program according to the embodiment.

Operation of the system of the activation control apparatus for the occupant protection apparatus will now be described in detail. When a user of the vehicle 10 brings an unillustrated ignition switch into a "ON" state, the ECU 12 mounted on the vehicle 10 repeatedly executes the processing program shown in FIG. 8 at predetermined short intervals.

Upon start of execution of the processing program from step S10, in step S11 the ECU 12 detects decelerations Gf, GI, and Gr. Specifically, the ECU 12 obtains via the input-output circuit 20 output signals from the floor sensor 14 and the front sensors 16 and 18, and detects the floor deceleration Gf and the front decelerations GI and Gr. The ECU 12 temporarily stores the detected floor deceleration Gf and front decelerations GI and Gr at a predetermined storage location of the RAM 26, and then proceeds to step S12.

In step S12, the ECU 12 sets the symmetric flag FRG to "FALSE," which indicates that a collision of the vehicle 10 is of an asymmetric collision type. Then, the ECU 12 proceeds to step S13 in order to calculate a velocity change Vn from the floor deceleration Gf detected and temporarily stored in the above-mentioned step S11. Specifically, the ECU 12 obtains the floor deceleration Gf, and time-integrates the thus-obtained floor deceleration Gf to thereby calculate the velocity change Vn. Then, the ECU 12 temporarily stores the calculated velocity change Vn at a predetermined storage location of the RAM 26, and then proceeds to step S14.

In step S14, the ECU 12 performs severity determination. Specifically, the ECU 12 first obtains the severity determination map stored in the ROM 24. Subsequently, the ECU 12 obtains the front decelerations GI and Gr temporarily stored in the RAM 26 in above-mentioned step S11, and the velocity change Vn stored at the predetermined storage location of the RAM 26 in the above-mentioned step S13. Then, the ECU 12 determines whether any one of the obtained front decelerations GI and Gr is in excess of the reference value. When the obtained front deceleration GI or Gr is greater the reference value, and the velocity change Vn is greater than the floor deceleration reference value V0, the ECU 12 determines that the severity of the collision is low. When the front deceleration GI or Gr is greater than the reference value, and the velocity change Vn is not greater than the floor deceleration reference value V0, the ECU 12 determines that the severity of the collision is high. When the front decelerations GI and Gr are not greater than the reference value, the ECU 12 ends the present execution of the processing program.

After completion of the severity determination in step S14, the ECU 12 calculates an activation threshold variation pattern in step S15. Specifically, the ECU 12 obtains the activation determination map stored in the ROM 24. Then, the ECU 12 obtains the velocity change Vn stored at the predetermined storage location of the RAM 26 in the above-mentioned step S13, and temporarily stores the values of the high and low map boundaries corresponding to the velocity change Vn at a predetermined storage location of the RAM 26.

After completion of calculation of the activation threshold variation pattern in step S15, in step S16, the ECU 12 determines whether either one of the front decelerations Gl and Gr is greater than the front determination map boundary, which serves as the front threshold variation pattern. Specifically, the ECU 12 obtains the front determination map stored in the ROM 24, and the front decelerations Gl and Gr temporarily stored in the RAM 26 in above-mentioned step S11. Subsequently, the ECU 12 makes a "Yes" determination when either one of the front decelerations Gl and Gr is greater than the front determination map boundary, and then proceeds to step S17.

In step S17, the ECU 12 validates the low map boundary calculated in the above-mentioned step S15, and determines whether the floor deceleration Gf detected in above-mentioned step S11 is greater than the value of the low map boundary, which serves as the activation threshold variation pattern. When the floor deceleration Gf is not greater than the low map boundary, the ECU 12 makes a "No" determination in step S17, and proceeds to step S24 so as to end the present execution of the processing program. Meanwhile, when the floor deceleration Gf is greater than the low map boundary, the ECU 12 makes a "Yes" determination in step S17, and proceeds to step S18.

In step S18, the ECU 12 outputs a drive signal for effecting first stage ignition of the airbag unit 30. Specifically, the ECU 12 outputs a drive signal to the drive circuit 32 of the airbag unit 30 so as to activate one of the ignition devices 38*a* and 38*b* of the inflators 34*a* and 34*b* of the airbag 36. In the airbag unit 30, the drive circuit 32 obtains the drive signal output from the ECU 12, and activates one of the ignition devices 38*a* and 38*b* on the basis of the drive signal. As a result, the airbag 36 is expanded and deployed through the first stage ignition.

Further, when neither of the obtained front decelerations Gl and Gr is greater than the value of the front determination map boundary, the ECU 12 makes a "No" determination in the above-mentioned step S16, and then proceeds to step S19.

In step S19, the ECU 12 determines whether the floor deceleration Gf is greater than the high map boundary, which serves as the activation threshold variation pattern. When the floor deceleration Gf is not greater than the high map boundary, the ECU 12 makes a "No" determination in step S19, and proceeds to step S24 so as to end the present execution of the processing program. Meanwhile, when the floor deceleration Gf is greater than the high map boundary, the ECU 12 makes a "Yes" determination in step S19, and proceeds to step S20. In step S20, the ECU 12 outputs a drive signal to the drive circuit 32 of the airbag unit 30 so as to effect the first stage ignition of the airbag 36 in the same manner as in the above-mentioned step S18, and then proceeds to step S21. In step S21, the ECU 12 sets the symmetric flag FRG to "TRUE," which indicates that the collision of the vehicle 10 is of a symmetric collision type. This setting is performed because the floor deceleration Gf is large enough to exceed the high map boundary, and the collision of the vehicle is predicted to be a symmetric collision, such as a head-on collision, a pole collision, or an underride collision, at an intermediate or high speed.

After completion of the processing in the above-mentioned step S18 or that in the above-mentioned step S21, the ECU 12 determines a delay time in step S22. Specifically, the ECU 12 first obtains the delay time table stored in the ROM 24. Subsequently, on the basis of the obtained delay time table, the ECU 12 determines a delay time; i.e., an intervening time between the first stage ignition and the second stage ignition of the airbag 36. Specifically, the ECU 12 checks the severity determined in the above-mentioned step S14 and the present state of the symmetric flag FRG. Then, the ECU 12 determines the delay time from the checked severity and state of the symmetric flag FRG.

After completion of the delay time determination processing in the above-mentioned step S22, in step S23, the ECU 12 outputs a drive signal for effecting the second stage ignition of the airbag unit 30, on the basis of the determined delay time. Specifically, the ECU 12 outputs a drive signal to the drive circuit 32 of the airbag unit 30 so as to activate the other of the ignition devices 38*a* and 38*b* which was not activated for the first stage ignition in the above-mentioned step S18 or S20. In the airbag unit 30, the drive circuit 32 obtains the drive signal output from the ECU 12, and, on the basis of the drive signal, activates the other of the ignition devices 38*a* and 38*b* which was not activated for the first stage ignition in the above-mentioned step S18 or S20. As a result, the airbag 36 is further expanded and deployed through the second stage ignition, which occurs subsequent to, or substantially concurrent with, the first stage ignition. After completion of the second stage ignition processing in the above-mentioned step S23, the ECU 12 proceeds to step S24 so as to end the present execution of the processing program.

As can be understood from the above description, according to the present embodiment, the ECU 12 can determine the symmetry of a collision portion of the vehicle 10 represented by the symmetric flag FRG; i.e., whether a collision is a symmetric collision, such as an intermediate or high speed head-on collision, pole collision, or underride collision, in which a collision portion is symmetric with respect to the center axis of the vehicle 10, or an asymmetric collision, such as an oblique or offset collision, in which a collision portion is asymmetric with respect to the center axis. Further, the ECU 12 can change the intervening time (delay time) between activation of one of the ignition devices 38*a* and 38*b* of the airbag unit 30, which serves as an occupant protection apparatus, and activation of the other of the ignition devices 38*a* and 38*b*. Therefore, activation of the airbag unit 30 can be optimally controlled in accordance with a collision time (i.e., a time of deceleration or a velocity change Vn of the vehicle 10 stemming from a collision), which varies depending on the collision type in terms of symmetry of a collision portion. Accordingly, the airbag unit 30 can properly protect an occupant from an impact caused by a collision.

Further, when the symmetric flag FRG is in the "FALSE" state, the ECU 12 increases the intervening time (delay time) to thereby increase the delay time between activation of one of the ignition devices 38*a* and 38*b* of the airbag unit 30 and activation of the other of the ignition devices 38*a* and 38*b* of the airbag unit 30, whereby the operated period can be extended. Therefore, even in the case of an oblique collision or an offset collision, in which the velocity change Vn of the vehicle 10 caused by a collision; i.e., the velocity change Vn of an occupant, is small, the ECU 12 can perform activation control in such a manner that the activated state of the airbag unit 30 is properly maintained, whereby the occupant can be properly protected. Meanwhile, when the symmetric flag FRG is in the "TRUE" state, the velocity change Vn of the occupant is high, and therefore, the ECU 12 can perform activation control in such a manner that the operated period of the airbag unit 30 becomes shorter. Thus, the occupant can be properly protected.

Moreover, the ECU 12 can optimally control activation of the airbag unit 30 through changing the delay time between the first stage ignition and the second stage ignition of the airbag unit 30 on the basis of the severity of a collision and the state of the symmetric flag FRG. Specifically, when the severity is high (severe) and the symmetric flag FRG is in the "TRUE" state, the velocity change Vn is large, and therefore, the ECU 12 activates the ignition devices 38a and 38b of the airbag unit 30 with the delay time set to 0 sec. When the severity is high (severe) and the symmetric flag FRG is in the "FALSE" state or when the severity is low (not severe) and the symmetric flag FRG is in the "TRUE" state, the velocity change Vn is relatively large, and therefore, the ECU 12 activates the ignition devices 38a and 38b of the airbag unit 30 with the delay time set to 30 msec. When the severity is low (not severe) and the symmetric flag FRG is in the "FALSE" state, the velocity change Vn is relatively small, and therefore, the ECU 12 activates the ignition devices 38a and 38b of the airbag unit 30 with the delay time set to 100 msec. Thus, the airbag unit 30 can protect an occupant in an optimal manner that has been finely adjusted in accordance with the nature of a collision that has occurred.

Moreover, on the basis of the magnitude of the floor deceleration Gf detected from the output signal of the floor sensor 14, the ECU 12 can determine that a collision that has occurred is a symmetric collision, by making use of the high map boundary, which serves as the activation determination pattern. Therefore, the ECU 12 can quickly determine that a symmetric collision has occurred and the velocity change Vn of an occupant is large, whereby the airbag unit 30 can be properly activated in an optimal manner, and thus the occupant can be properly protected.

Obviously, numerous modifications and variations of the present invention are possible in light of the above teachings. It is therefore to be understood that within the scope of the appended claims, the present invention may be practiced otherwise than as specifically described herein.

The invention claimed is:

1. An activation control apparatus for controlling activation of an occupant protection apparatus that protects an occupant during collision of a vehicle, comprising:
   a first sensor disposed in a vehicle body to be located at a predetermined position, the first sensor outputting a signal corresponding to deceleration acting on the vehicle;
   a second sensor disposed in the vehicle body to be located forward with respect to the first sensor, the second sensor outputting a signal corresponding to deceleration acting on the vehicle;
   collision severity determination means for determining, on the basis of the signals output from the first and second sensors, a collision speed experienced by the vehicle;
   collision symmetry determination means for determining, on the basis of the signals output from the first and second sensors, whether a collision portion of the vehicle involved in the collision has symmetry;
   delay time changing means for changing, on the basis of the collision speed determined by the collision severity determination means and results of the symmetry determination performed by the collision symmetry determination means, a delay time to be provided between a point in time when a first output of the occupant protection apparatus is activated and a point in time when a second output of the occupant protection apparatus is activated; wherein when the collision severity determination means determines that the collision speed experienced by the vehicle is high or the collision speed experienced by the vehicle is low relative to a threshold and the collision symmetry determination means determines that the collision portion of the vehicle does not have symmetry, the delay time changing means sets the delay time to a long time as compared with a case in which the collision portion of the vehicle has symmetry; and
   activation control means for controlling the activation of the first and second outputs of the occupant protection apparatus on the basis of the delay time changed by the delay time changing means.

2. An activation control apparatus according to claim 1, wherein the delay time changing means sets the delay time to zero when the collision severity determination means determines that the collision speed experienced by the vehicle is high and the collision symmetry determination means determines that the collision portion of the vehicle has symmetry;
   the delay time changing means sets the delay time to a first value when the collision severity determination means determines that the collision speed experienced by the vehicle is high and the collision symmetry determination means determines that the collision portion of the vehicle does not have symmetry or when the collision severity determination means determines that the collision speed experienced by the vehicle is low and the collision symmetry determination means determines that the collision portion of the vehicle has symmetry; and
   the delay time changing means sets the delay time to a second value that is larger than the first value when the collision severity determination means determines that the collision speed experienced by the vehicle is low and the collision symmetry determination means determines that the collision portion of the vehicle does not have symmetry.

3. An activation control apparatus according to claim 1, wherein the collision symmetry determination means determines that the collision portion of the vehicle has symmetry when the deceleration acting on the vehicle and represented by the signal output from the first sensor is greater than a predetermined level.

4. An activation control apparatus according to claim 1, wherein the delay time changing means sets the delay time to a long time as compared with a case in which the collision severity determination means determines that the collision speed experienced by the vehicle is high and the collision symmetry determination means determines that the collision portion of the vehicle has symmetry, when the collision severity determination means determines that the collision speed experienced by the vehicle is low and the collision symmetry determination means determines that the collision portion of the vehicle does not have symmetry.

* * * * *